(12) United States Patent
Muster et al.

(10) Patent No.: US 10,330,448 B2
(45) Date of Patent: Jun. 25, 2019

(54) FRAGMENTATION PROJECTILE AND METHOD FOR ITS MANUFACTURING

(71) Applicant: RUAG Ammotec AG, Thun (CH)

(72) Inventors: Michael Muster, Schuepfen (CH); Juergen Wolf, Thun (CH); Donald Meyer, Grolley (CH); Peter Spatz, Schmitten (CH)

(73) Assignee: RUAG Ammotec AG, Thun (CH)

( * ) Notice: Subject to any disclaimer, the term of this patent is extended or adjusted under 35 U.S.C. 154(b) by 217 days.

(21) Appl. No.: 15/342,202

(22) Filed: Nov. 3, 2016

(65) Prior Publication Data

US 2018/0112961 A1    Apr. 26, 2018

Related U.S. Application Data (60) Provisional application No. 62/267,987, filed on Dec. 16, 2015.

(51) Int. Cl.
| | |
|---|---|
| *F42B 12/36* | (2006.01) |
| *F42B 5/02* | (2006.01) |
| *F42B 5/03* | (2006.01) |
| *F42B 8/14* | (2006.01) |
| *F42B 12/06* | (2006.01) |
| *F42B 33/00* | (2006.01) |

(52) U.S. Cl.
CPC ............ *F42B 12/367* (2013.01); *F42B 5/025* (2013.01); *F42B 5/03* (2013.01); *F42B 8/14* (2013.01); *F42B 12/06* (2013.01); *F42B 33/00* (2013.01)

(58) Field of Classification Search
None
See application file for complete search history.

(56) References Cited

U.S. PATENT DOCUMENTS

| 4,142,467 A | 3/1979 | Stahlmann et al. |
| 4,603,637 A * | 8/1986 | Snide .................. F42B 8/16 102/517 |
| 4,635,556 A | 1/1987 | Boecker et al. |
| 4,697,525 A | 10/1987 | Boecker et al. |
| 6,024,021 A | 2/2000 | Schultz |
| 8,622,001 B1 | 1/2014 | Patel et al. |
| 9,212,876 B1 | 12/2015 | Kostka et al. |
| 2006/0054047 A1 | 3/2006 | Burri |
| 2014/0318405 A1 | 10/2014 | Dikhoff et al. |

(Continued)

FOREIGN PATENT DOCUMENTS

| AT | 366 489 B | 4/1982 |
| EP | 0 088 898 A1 | 9/1983 |

(Continued)

OTHER PUBLICATIONS

International Search Report of PCT/IB2016/057423, dated Feb. 17, 2017.

(Continued)

*Primary Examiner* — Samir Abdosh
(74) *Attorney, Agent, or Firm* — Collard & Roe, P.C.

(57) ABSTRACT

A fragmentation projectile in one aspect has a frontal cavity and defined fragments of medium to high density. The fragments are nearly form fitting together to form a compact projectile until its impact on the target. To achieve these specific mechanical properties, Additive Manufacturing (AM) methods are applied.

24 Claims, 8 Drawing Sheets

(56) References Cited

U.S. PATENT DOCUMENTS

2014/0326158 A1* 11/2014 Fritz .................. F42B 5/025
    102/524
2015/0048553 A1*  2/2015 Dietrich ............ B22F 3/1055
    264/401

FOREIGN PATENT DOCUMENTS

| EP | 0 989 381 A2 | 3/2000 |
| EP | 1 196 734 B1 | 4/2003 |
| EP | 2 314 980 A2 | 4/2011 |
| GB | 2 011 041 A  | 7/1979 |
| WO | 2013/020976 A1 | 2/2013 |

OTHER PUBLICATIONS

Written Opinion of the International Searching Authority of PCT/IB2016/057423, dated Jun. 22, 2017.
International Preliminary Report on Patentability of PCT/IB2016/057423, dated Oct. 25, 2017.
International Preliminary Examination Amendments according to Art. 34 in PCT Application No. PCT/IB2016/057423, dated Apr. 27, 2017.

* cited by examiner

FRAGMENTATION PROJECTILE AND METHOD FOR ITS MANUFACTURING

CROSS REFERENCE TO RELATED APPLICATIONS

This application is a non-provisional application that hereby claims priority under 35 U.S.C. 119(e) from U.S. Provisional Patent Application Ser. No. 62/267,987 filed Dec. 16, 2015, the disclosure of which is incorporated herein by reference.

BACKGROUND OF THE INVENTION

1. Field of the Invention

The invention relates to a fragmentation projectile with a frontal cavity and defined fragments of medium to high density.

2. Description of the Related Art

Projectiles which split in a specific manner in the target are referred to as fragmentation projectiles. Such a projectile is known from the EP-B1-1 196 734 and features large recesses at its tip which are unfavorable from an aerodynamics point of view. The attempt is made to close the hole-type recesses in the tip by means of covers, plugs, etc. in such a manner that the aerodynamics is improved, but this leads to nonsymmetries. These nonsymmetries prove to be particularly unfavorable in soft targets, where tumbling movements and undesired fragmentation effects occur which can in turn cause major injuries and/or collateral damage.

SUMMARY OF THE INVENTION

It is the objective of the present invention, therefore, to create a projectile which splits in the target in a controlled manner into predefined fragments, and this without splitting into further fragments or, if at all, only fragments that are easily detectable.

A further objective of the invention is to achieve a trajectory which is to maximum extent identical with that of a full-jacketed projectile.

In the target, furthermore, a maximum of kinetic energy should be deposited, as far as possible on the target's surface, and full penetrations of the target should be avoided if at all possible. The fragment penetration depth into soft targets should be predeterminable, especially where the ammunition is flying in the subsonic range.

No stability problems are allowed to occur on firing of the projectile. Splitting into fragments in the target is to take place suitable for the mission's purpose and in a controlled or oriented manner. The projectile should be able to act sensitively against a hydrodynamic axial strain. It should be possible, furthermore, to optimize the penetration depth of the fragments according to wound-ballistic as well as collateral-damage criteria. Any resulting residual pieces should be as large and few as possible.

It should be possible to easily optimize the predetermined breaking points which are of importance in fragmentation, projectiles. This in accordance with the principles of modern fracture mechanics.

With a view to minimal wear in the launcher tube or weapon barrel the surface of the projectile should be suitable for optimization. In addition the surface of the projectile should be optimizable according to aerodynamic principles.

The projectile caliber according to the invention should be realizable for anything from handguns over military small-caliber weapons (ordnance) and hunting weapons right to large dimensions. By means of the projectile's mechanical properties it should be possible to easily master the tail strains on firing as well as the resulting centrifugal strains in the case of twist-stabilized projectiles, without impairment of the further goals of the subject-matter of the invention.

The manufacturing process of the fragmentation projectile should enable a high precision of the projectile shape and present the least possible design barriers, so that even so far unrealized projectile shapes become possible.—The preferred manufacturing process must be able to realize topology-oriented projectile designs.

A fragmentation projectile in accordance with the invention is characterized by the features that the fragments are nearly form fitting together to form a compact projectile until its impact on the target.—The term "nearly form fitting" means that the distances between the individual fragments do not exceed 100 µm.

Advantageous developments of the subject of the invention are discussed below.

The fragmentation projectile in accordance with an embodiment is designed in such a manner that only a minimum of form fitting connections are planned to convey the kinetic energy to the target, and not to carry out the deformation work.

Preferred—according to current perception—are fragments comprising brass or bronze and/or a lead-free alloy of both, since they cause only little wear in the launcher tube even without additional coating.

Fragmentation projectiles wherein the fragments extend around a core of tungsten or wherein central fragments are of tungsten and/or an alloy thereof are recommended if the penetration capacity should be increased.

The manufacture of projectiles wherein the projectile comprises a steel alloy and where in its surface is coated is inexpensive and causes no exceptional problems in the production process.

Coatings comprising tin, copper or an alloy thereof are basically well-proven in weapon systems.

A multiple, frame-like structure in accordance with another embodiment improves the desired fragmentation effect in the target.

A maximum aperture of the front cavity amounting to 0.2-times of the projectile's caliber is a fraction of what is common according to state of the art technology and guarantees an optimal aerodynamics and energy deposition in the target.

Fragments arranged in axial direction serve to achieve a good fragmentation effect.

A structure wherein the fragments are shaped in radial direction provides for fragments which transmit an optimum of energy onto the surface of a target and which penetrate the target to a relatively minor extent only.

The distances between the fragments ranging from 3 µm to 100 µm are aerodynamically favorable and guarantee the desired effect in the target despite few connecting points.

Composites are easier to optimize with regard to their density than metal alloys. This enables novel projectile designs.

Composite materials containing ceramics and/or polymers can readily be used for a desired shifting of the point of gravity in a projectile design.

A cavity having at least in its front area the shape of an equilateral triangle has proved to be particularly suitable since the sharp angles of an equilateral triangle result in the maximum and central notch effect for the fragmentation in the target.

A spiral-shaped layout of the cavity, triangular in its cross-section, can serve for the radial distribution of the fragments if the fragments are shaped against the projectile's direction of twist.

Kinetic-energy projectiles, in particular dart bullets, require the release of the jacket in flight to be as reproducible as possible. This is made possible by the design wherein the tip of a dart projectile is located in the cavity.

In principle all embodiments mentioned above are suitable for pistol ammunition.

These embodiments are suitable for both police ammunition and, adapted to the desired target effect, as military small-caliber ammunition.

Analogously to police ammunition, the target effect can be aligned to nearness, a highly important aspect for flight attendants in order to prevent serious damage to the aircraft's hull (windows, etc.); so-called marshal ammunition.

Combinations of the above fragmentation projectile embodiments can be taken advantage of in perfectly suitable hunting ammunition since perforations can be eliminated thanks to the fragmentation.

Combating targets under water with fragmentation projectiles is a particularly delicate task because the projectiles frequently split already on impacting the water surface. The subject-matter of the invention can cope also with this problem by a suitable number of integral material fitting connections. Alternatively, dart ammunition can be used whose outer body (fragments) detaches on impacting the water surface and the dart as a tail-stabilized projectile shoots through the water in a straight line.

Analogously to small-caliber ammunition, large-caliber ammunition can be designed so that the subject matter of the invention can also be applied to it.

In the case of subsonic projectiles, for examples, the texture of the surface can be structured with the intention of reducing the flow resistance, cf. WO-A1-2013/020976. The projectile's tip, furthermore, can be provided with a small vibration damper; cf. EP-A2-2 314 980.

Using conventional manufacturing methods and equipment, the afore-described topology-oriented designs cannot be produced at all or only in connection with major disadvantages. An "Additive Manufacturing" (AM) manufacturing process, on the other hand, is perfectly suitable for such designs.

From today's point of view producing the projectile on the basis of "Direct Metal Deposition" (DMD) with "Multipowder Feeder" and by "Laser Powder-Spray Manufacturing" (LPM) permits to increase the production rate and decrease the production costs compared with other methods.

All processes of Additive Manufacturing (AM) permit to carry out subsequent mechanical finishing if appropriate, whereby particularly advantageous appear to be the ones wherein prior to its fitting into a cartridge, the projectile is smoothened by grinding and/or barrel finishing.

For the formation of gaps according to the process wherein the radiation source or fed between the fragments to be formed is switched off for such a length of time that, of the fed or existing metal or ceramic or polymer powder, 1 to 6 grains are not melted or sintered.

BRIEF DESCRIPTION OF THE DRAWINGS

In the following schematically illustrated embodiments will be shown and described. These can be produced by Additive Manufacturing (AM).

DETAILED DESCRIPTION OF PREFERRED EMBODIMENTS

Figure 1:
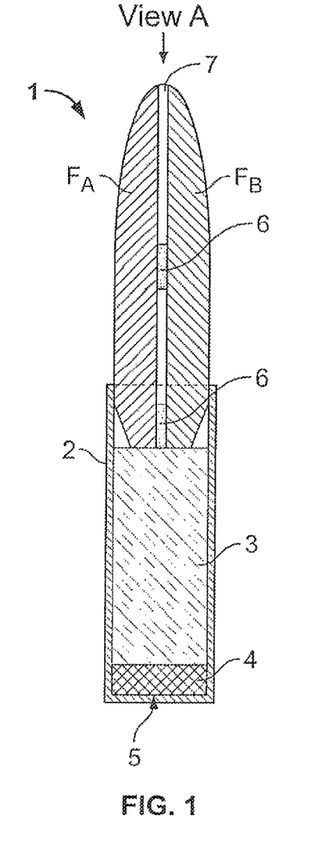
FIG. 1 shows a subsonic cartridge containing a projectile which splits in the target into three longitudinally oriented fragments and its propellant.
Figure 2:
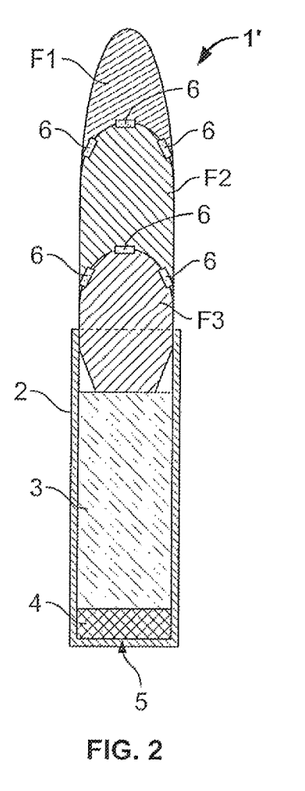
FIG. 2 shows, alternatively, a subsonic cartridge containing s projectile which splits in the target into three rotationally oriented fragments, and its propellant.
Figure 3:
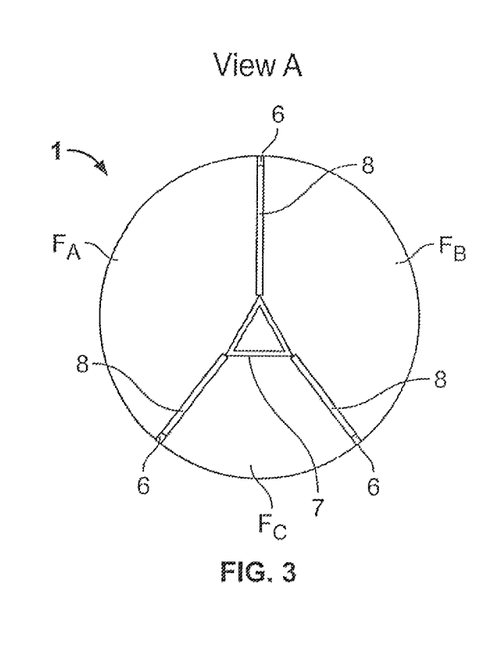
FIG. 3 shows the projectile of FIG. 1 seen from above in direction A, with its three longitudinally oriented fragments.

Evident in FIGS. 1 to 3 are two schematic presentations of subsonic projectiles 1, 1' with their cartridges 2, of the type intended as small-caliber ammunition for police interventions. The cartridges 2 are provided in the known manner with a propellant charge 3, an ignition charge 4 and a fuse 5.

The presentation in FIG. 3 shows that a triangular cavity 7 follows the three fragments $F_A$, $F_B$, $F_C$. The fragments $F_A$, $F_B$, $F_C$ are linked to each other by integral material fitting connections in the spots marked 6, so that after firing of projectile 1 until its impact on the target, they stay together as one compact projectile with good flight properties.

On impact on the target the fragments $F_A$, $F_B$, $F_C$ are torn apart and spread over a large area of the target. Such an ammunition could be fired on e.g. an escape vehicle so that it will lose e.g. its fuel and/or the air from its tires.

Alternatively to FIG. 1, the projectile according to FIG. 2 is divided into three radial fragments F1, F2, F3. During its flight, the projectile 1' is again held together by integral fitting material connecting spots 6.

Such a projectile could be fired in e.g. a police intervention on escaping persons, since it can transmit a maximum of energy onto a body surface to cause the escaper to fall.

Such projectile shapes can be produced with precision by Additive Manufacturing (AM). The cavity 7 in FIGS. 1 and 2 has an edge length amounting to 0.1 of the caliber, while the crevices 8 between the fragments $F_A$, $F_B$, $F_C$ (see FIG. 3) amount to 50 μm each. The projectile in FIG. 2 features calotte-shaped crevices of 10 μm each between the fragments F1, F2 and F3. These small crevices can in turn be produced easily by AM in that the radiation source is specifically and temporarily switched off during the AM process. Inversely, by returning the energy supply to the radiation source, the usually powdery materials are melted together with the fragments to be connected in the desired connecting spots 6.

The crevices between the fragments can vary. Due to the high impulse on firing, for example, it is recommended to select smaller crevices in the tail section of the projectile and bigger ones in the front section. Moreover, the shapes of the fragments can be combined with each other according to the principles of FIG. 1 and FIG. 2. Also, the crevices do not have to run parallel and/or the connecting spots can be distributed non-symmetrically. The latter in order to influence the direction of flight and the penetration of defined fragments as well as parts of fragments in the target. The choice of material for the fragments is nearly unlimited. With all its design variables the subject-matter of the invention can be adapted to the effect desired in the target. Furthermore, AM provides the possibility of developing projectiles customized for the application purpose, the strategy and the intervention doctrine within the shortest of time. A further benefit is that the projectile can be laid out for new tasks at short notice, for example to fight terrorism, without a need to change production methods.

Figure 4:
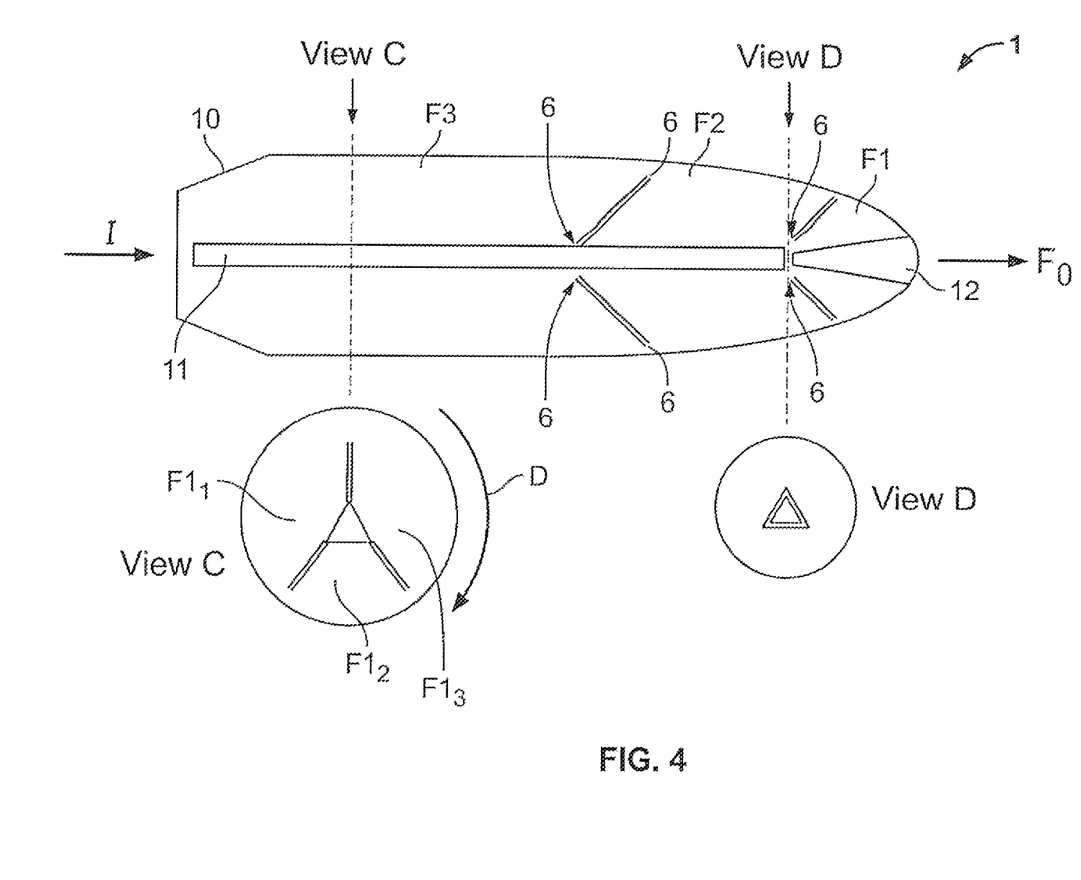
FIG. 4 shows the schematic structure of a further-development of a projectile according to FIG. 1.

The concept according to FIG. 4 shows a projectile 1 of bronze of caliber 7.62 which, on being fired, is accelerated with an impulse I and leaves a rifle barrel still as a compact projectile in flight direction $F_0$. The fragments are again denoted as F1 to F3 and the tail 10 is strongly tapered. A triangle-shaped inner cavity 11 extends over the biggest part of the projectile's length, while a smaller cavity 12 at the front of the projectile has a break-out function for the fragments F1 to F3 at the target. The cross-sectional view C and view D disclose the cavities' ratios of size and show the subsequent fragmentation of the segments $F1_1$, $F1_2$ and $F1_3$. Well apparent are the integral fitting material connections 6 between the individual elements and their dimensions in relation to the caliber.

Of particular significance is the shape of the cavities 11 and 12, in their cross-section equilateral triangles with sharp angles of 60°, which result in a high notch factor so that an impeccable fragmentation is ensured already by the fracture mechanics. This shape cannot be produced by means of conventional machining equipment and tools. Corresponding processes are described below.

Figure 5:
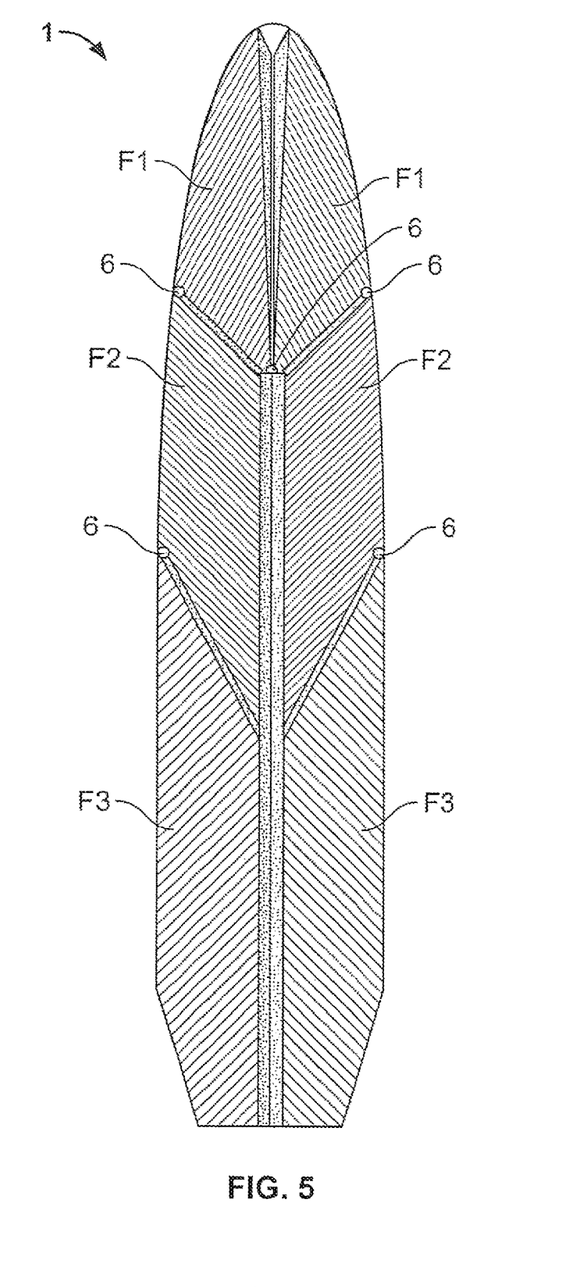
FIG. 5 shows an implemented variant of a projectile according to FIG. 4 in sectional presentation.

A real projectile shape is shown in FIG. 5; the fragments in the same section are again denoted as F1 to F3, and the integral fitting material connections 6 are also indicated.

Figure 6:
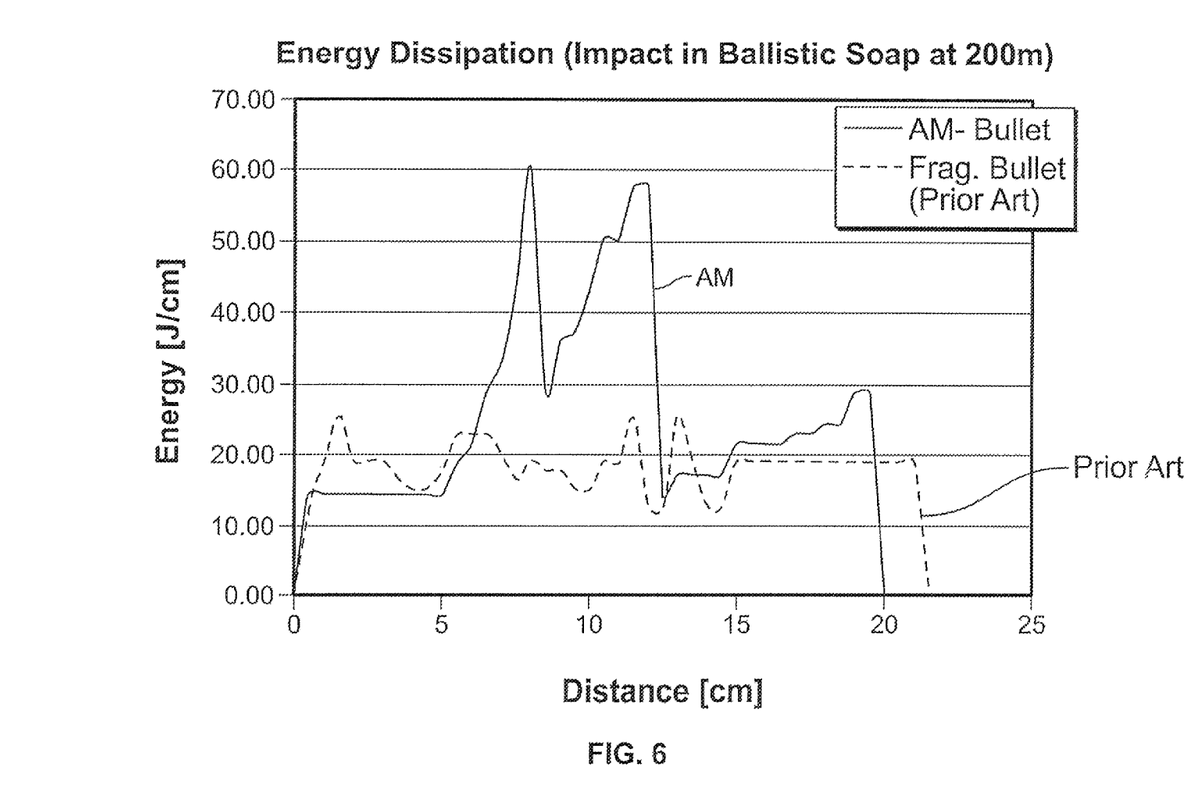
FIG. 6 shows the energy dissipation of an inventive projectile in relation to Prior Art.

Diagram FIG. 6 shows the measured energy dissipation in Joule per cm in dependence on the penetration depth in ballistic soap at a distance of 200 m. The results of the inventive fragmentation projectile of caliber 7.62 are marked AM and shown as an uninterrupted line, whereas the results of a state of the art projectile of the same caliber are marked Prior Art and shown as an interrupted line.

It is evident that, compared with the projectile of state of the art technology, the inventive projectile marked AM displays roughly three times higher energy dissipation with corresponding amplitudes at a firing distance of 200 m. Also remarkable are the peak values of the inventive projectile at a penetration depth of 8 to 13 cm.

Figure 7:
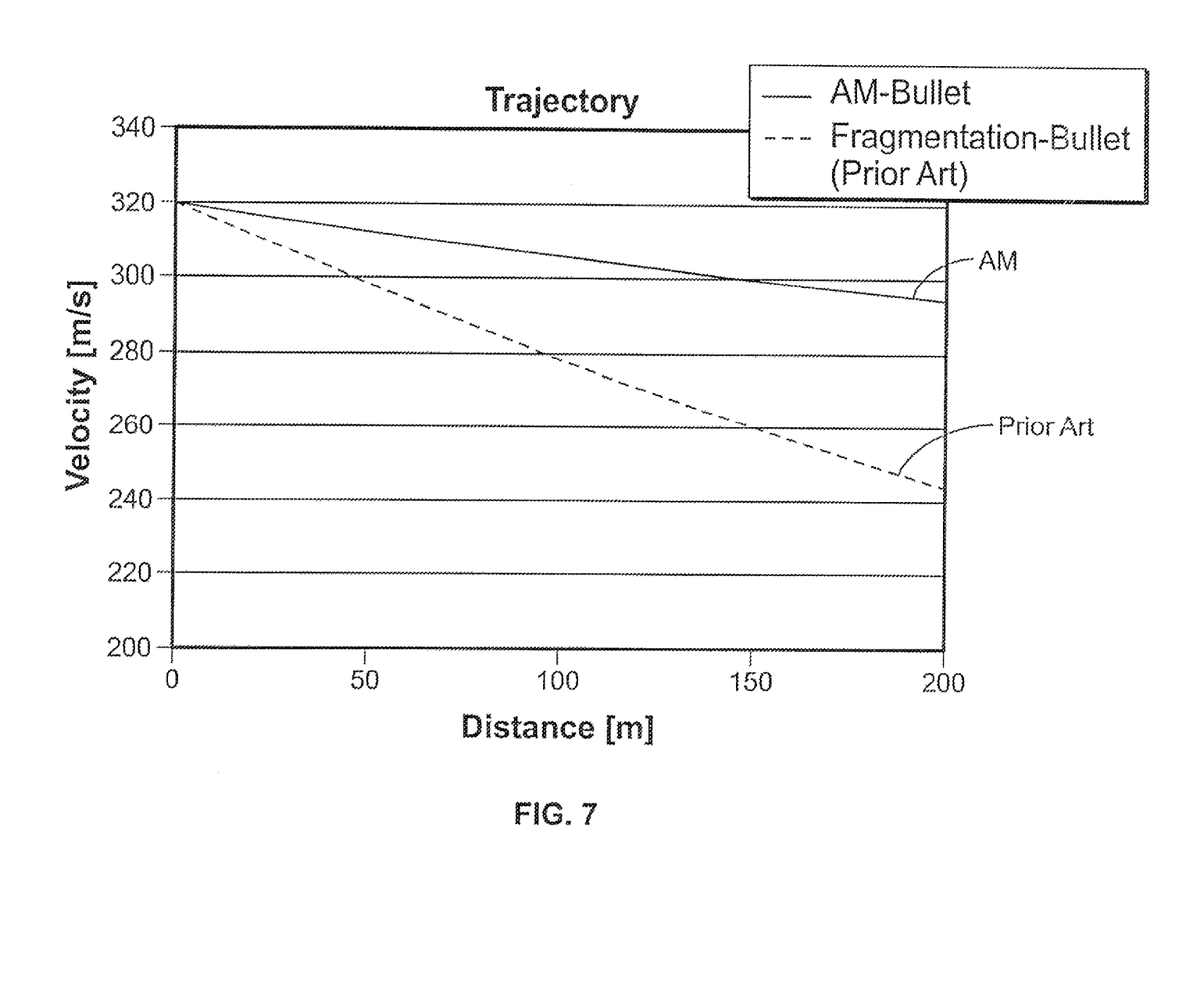
FIG. 7 shows the velocity of an inventive projectile versus Prior Art.

The trajectories of the two projectiles are shown analogously in FIG. 7. It is remarkable that the two projectiles, after an identical firing velocity v0 of 320 m/s, display such different end velocities after a distance of 200 m: AM=294 m/s against only 244 m/s of the state of the art technology projectile.

Figure 8:
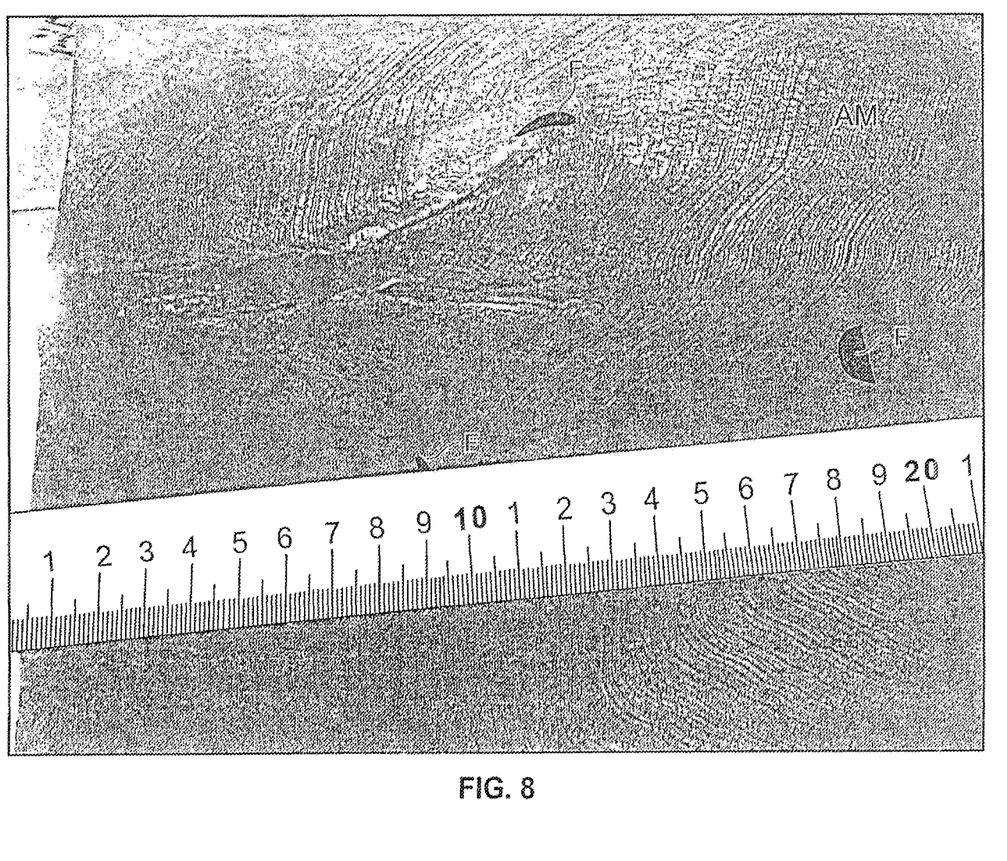
FIG. 8 shows fragmentation of an inventive projectile.

The fragments distribution of an inventive, additive manufactured projectile AM is characterized by few large and easily removable fragments F as shown in FIG. 8.

Figure 9:
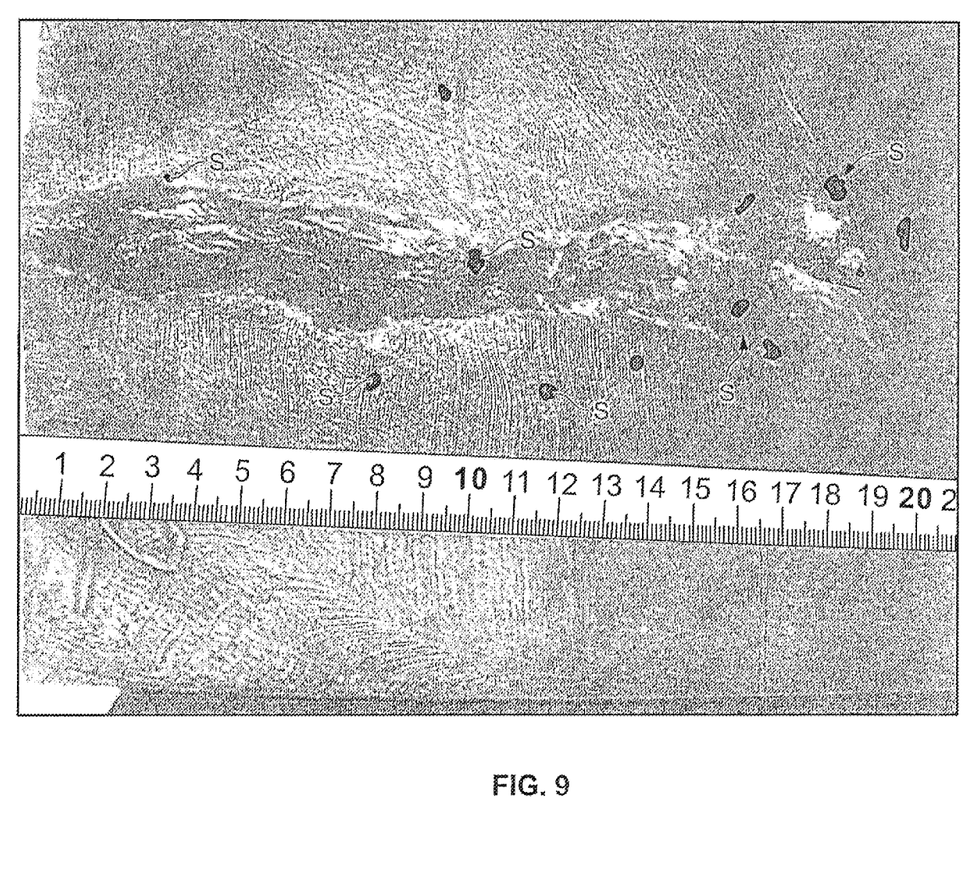
FIG. 9 shows fragmentation of a conventional projectile.

FIG. 9, on the other hand, shows according to prior art, a multitude of small fragments S which are removable only with difficulty or not at all, spread over a wide area.

For graphic reasons the fragments F and S in FIGS. 8 and 9, respectively, are shown in one plane, whereas in reality they are radially distributed in the direction in which they entered the target.

The discussed example of a projectile, was produced as a prototype by 3D printing applying the Powder Bed Laser Beam Technology (LBM) process. It consists of: Cu 77.0%, Ni 14.7%, Sn 6.8%, P 1.5% (percent by weight) with a grain size of 53 μm to 99%.

Figure 10:
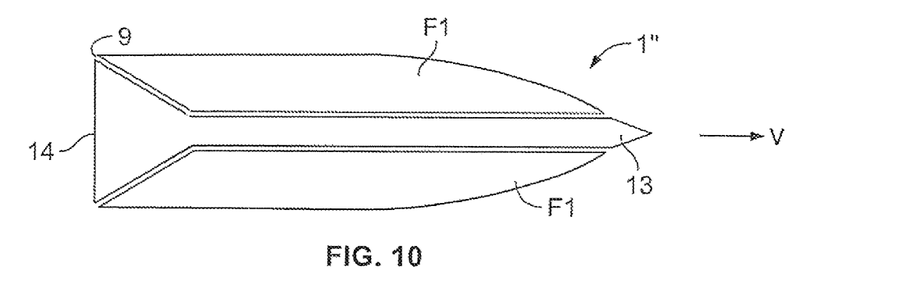
FIG. 10 shows a dart ammunition in schematic presentation for underwater use.
Figure 11:
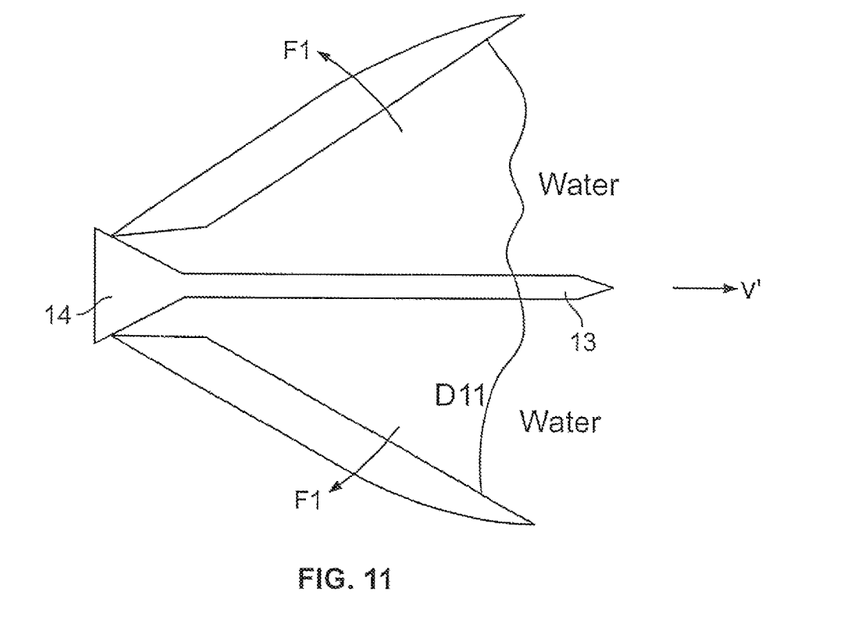
FIG. 11 shows the dart ammunition on impacting the water surface and FIG. 12 shows the dart ammunition in the water on its way to the target.
Figure 12:
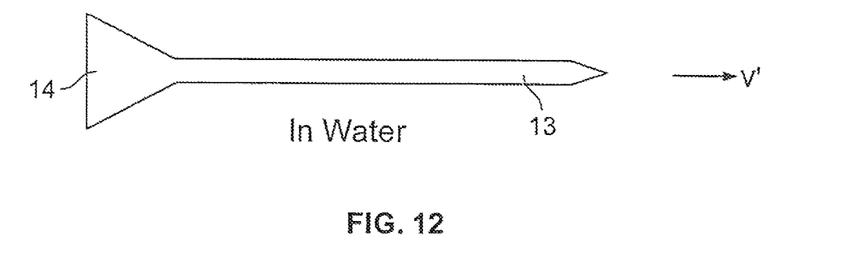

FIGS. 10 to 12 are intended as a possible special application. According to FIG. 10 a projectile 1" is fired with velocity v, from above a water surface at an underwater target. An arrow or dart 13 is located in the projectile's central hollow space 9 formed by the fragments F1. The projectile 1" impacts the water surface at speed v', FIG. 11. The fragments F1 are torn away on impact. Arrow 13 now penetrates the water, FIG. 12, and shoots, stabilized by its tail 14, in a straight line towards its target.

Compared with conventional design methods and their associated material-technical and equipment-technical limitations, topology-oriented designs allow basically new projectile shapes with specific functions and effects.

All designs disclosed here can be manufactured without need for special tools, directly by means of Computer Aided Design (CAD) in the sense of Computer Integrated Manufacturing (CIM) and produced efficiently in small series. The overview given hereafter allows the ordinary man trained in the art, to select the production process suitable for the application on hand and to find the adequate machinery.

Manufacturing of Projectiles According to the Invention

The new design demands special kind of manufacture. At present metal 3D printing technologies are foreseen. The respective terminology is applied in many different ways, whereas different names are used by different equipment manufacturers. Norms and standardization are only on their way. Three main types of 3D printing technologies are:

1. Powder Bed Laser Beam Technology (LBM)
2. Powder Bed Electron Beam Technology (EBM)
3. Powder Spray Laser/Electron Beam Technology (LFM/EFM)

LBM renders high precision and low roughness of surfaces and is mainly used to produce complex internal cavities.—Velocity of production is slow.

EBM is faster than LBM; results in lower thermal stresses due to preheating of the powder.—The resulting texture is relatively rough and complex internal cavities are at present not possible.

LFM/EFM allows the production of large parts as well.— In particular EFM calls for production in vacuum or in Helium atmosphere; equipment and maintenance are costly. Both LFM and EFM at present do not allow complex structures nor to influence material properties in different layers of product, and are less precise than the two foregoing methods. The further development of the conventional metallization technology (metal jet) to Direct Metal Deposition (DMD) with multi power feeder to Laser Powder-Spray Manufacturing (LPM) seems to be very promising for AM of large quantities also of small products like small calibre projectiles.

As a result of the high quantities of projectiles needed, only Additive Manufacturing (AM) seems to be appropriate. Selective Laser Melting (SLM), a method belonging to the first listed LBM, allows using a wide range of powder materials e.g. based on Iron, Nickel, Aluminum, Titanium and also of brass and bronze alloys in an atmosphere of Argon or Nitrogen. Generally alloys with low melting point and vapor pressure may obstruct the optical devices of equipment and therefore need special care. Conventional laser systems are, due to reflections and low energy absorption, not recommended for additive manufacturing of designs with copper alloys; newly developed blue and green pulse-lasers seem to be more suitable.

Basically all methods of AM are applicable to new designs of projectiles. In other words, new manufacturing methods with improved material technology allow new designs and precise load calculations and computer simulations by using the methods of fracture mechanics. Material textures of requested properties (metallographic micrographs) could be designed and realized for special needs. It would be possible to combine or integrate different AM methods either into the same equipment or in different steps of manufacturing.

Conventional metal forming by cutting e.g. by grinding or barrel finishing (Trowalisieren®, Trade Mark of Walther Trowal GmbH & Co. KG, D-42781 Haan) can easily be added to AM.

Today's AM technologies are limited to quantities of up to 3,000 pieces, due to costs and equipment. The demand for large quantities, like those for projectiles, is expected by experts to be adequately produced at appropriate costs after the year 2025.

LIST OF DESIGNATIONS 1, 1' Projectiles
1" Projectile for underwater target
2 Cartridge
3 Propellant charge
4 Ignition charge
5 Fuse
6 Connecting spots
7 Cavity Δ
8 Crevice
9 Hollow space
10 Tail of 1
11 Inner cavity (central)
12 Smaller cavity (front)
13 Dart (underwater projectile)
14 Tail (stabilization of underwater projectile)
AM Additive Manufacturing/Inventive Projectiles
I Impulse
F Fragments (in soap)
$F_A$, $F_B$, $F_C$ longitudinally aligned fragments
v0 Firing velocity
v Flight velocity
v' Momentary flight velocity
$F_0$ Direction of flight (after leaving the rifle barrel)
S Fragments in soap
View A to D Viewing direction/detail drawing What claimed is:

1. Process for the production of a fragmentation projectile partially comprising defined nearly form fitting segments, having connecting spots between consecutive longitudinally and/or radially oriented segments, wherein the connecting spots are formed due to the consecutive and/or radially oriented segments contacting each other, wherein said segments and spots are produced by additive manufacturing (AM), so that the segments are nearly form fitting with a maximum distance between adjacent segments of 100 μm and partly material fitting to keep together to form a compact projectile until its impact on the target, and wherein upon the impact on the target the segments are torn apart and spaced over a large area of the target.

2. Process for the production of a fragmentation projectile according to claim 1, wherein the projectile is produced by "Powder Bed Laser Beam Technology" (LBM) process, whereby crevices are created with the radiation source temporarily switched off for such a length of time that, of the fed or existing metal or ceramic or polymer powder, 1 to 6 grains are not melted or sintered.

3. Process for the production of a fragmentation projectile according to claim 1, wherein the projectile is produced by "Powder Bed Laser Beam Technology" (LBM) process, with a grain size of 53 μm to 99%, consisting of Cu 77.0%, Ni 14.7%, Sn 6.8% and P 1.5% (percent by weight).

4. Process for the production of a fragmentation projectile according to claim 1, wherein the projectile is produced on the basis of "Direct Metal Deposition" (DMD) with "Multipowder Feeder" and/or by "Laser Powder-Spray Manufacturing" (LPM).

5. Process for the production of a fragmentation projectile according to claim 1, wherein, prior to its fitting into a cartridge, the projectile is smoothened by grinding and/or barrel finishing.

6. Fragmentation projectile produced by additive manufacturing (AM) according to claim 1, with defined nearly form fitting segments, wherein consecutive segments are nearly form fitting with crevices ranging from 3 μm to 100 μm and with partially material fitting connecting spots form a compact projectile until its impact on the target.

7. Fragmentation projectile produced by additive manufacturing (AM) according to claim 6, further comprising a frontal cavity and spots between defined segments and in the frontal cavity, whereby the segments are nearly form fitting together to form a compact projectile until its impact on the target.

8. Fragmentation projectile produced by additive manufacturing (AM) according to claim 7, wherein the cavity has at least in its front area the shape of an equilateral triangle.

9. Fragmentation projectile produced by additive manufacturing (AM) according to claim 7, wherein the cavity is at least in one front segment of spiral shape in opposite direction of the projectile's twist.

10. Fragmentation projectile produced by additive manufacturing (AM) according to claim 7, wherein the frontal cavity features a maximum aperture amounting to 0.2-times of the projectile's caliber.

11. Fragmentation projectile produced by additive manufacturing (AM) according to claim 6, wherein the segments comprise brass or bronze and/or a lead-free alloy of both.

12. Fragmentation projectile produced by additive manufacturing (AM) according to claim 6, wherein the segments extend around a dart of tungsten or wherein central segments are of tungsten and/or an alloy thereof.

13. Fragmentation projectile produced by additive manufacturing (AM) according to claim 6, wherein the projectile comprises a steel alloy and wherein its surface is coated.

14. Fragmentation projectile produced by additive manufacturing (AM) according to claim 13, wherein the coating comprises tin, copper or an alloy thereof.

15. Fragmentation projectile produced by additive manufacturing (AM) according to claim 6, wherein the segments form a frame of at least two parts which frame remains connected until the impact on the target and which features a decreasing resistance to fracture towards the tip.

16. Fragmentation projectile produced by additive manufacturing (AM) according to claim 6, wherein at least a part of the segments comprises a composite material.

17. Fragmentation projectile produced by additive manufacturing (AM) according to claim 16, wherein the composite material contains ceramics and/or polymers.

18. Fragmentation projectile produced by additive manufacturing (AM) according to claim 7, wherein in the cavity the tip of a dart projectile is located.

19. Pistol ammunition comprising a projectile according to claim 6.

20. Police ammunition comprising a projectile according to claim 6.

21. Military small-caliber ammunition comprising a projectile according to claim 6.

22. Ammunition for hunting purposes comprising a projectile according to claim 6.

23. Mortar or artillery ammunition comprising a projectile according to claim 6.

24. Ammunition for underwater targets comprising a projectile according to claim 18.

\* \* \* \* \*